United States Patent [19]

Iijima et al.

[11] Patent Number: 4,844,483
[45] Date of Patent: Jul. 4, 1989

[54] FLOATING SEAL DEVICE

[75] Inventors: Katsuhiko Iijima; Yasumi Shiraishi, both of Sagamihara; Shoji Mizoe; Youichi Ogata, both of Sakado, all of Japan

[73] Assignees: Mitsubishi Jukogyo Kabushiki Kaisha; Eagle Industry Co., both of Tokyo, Japan

[21] Appl. No.: 249,559

[22] Filed: Sep. 26, 1988

[30] Foreign Application Priority Data

Dec. 23, 1987 [JP] Japan .................................. 62-193925

[51] Int. Cl.$^4$ ............................................. F16J 15/38
[52] U.S. Cl. ...................................... 277/83; 277/84; 277/92; 277/237 R
[58] Field of Search ....................... 277/82, 83, 84, 92, 277/95, 81 R, 237

[56] References Cited

U.S. PATENT DOCUMENTS

| 3,180,648 | 4/1965 | Kuppert et al. | 277/92 |
| 3,322,430 | 5/1967 | Voitik | 277/84 X |
| 4,168,868 | 9/1979 | Shields | 277/95 X |

FOREIGN PATENT DOCUMENTS

| 758471 | 5/1967 | Canada | 277/92 |
| 56-164280 | 12/1981 | Japan | 277/92 |

Primary Examiner—Robert S. Ward
Attorney, Agent, or Firm—Wenderoth, Lind & Ponack

[57] ABSTRACT

A floating seal device includes a fixed side O-ring held by a fixed side seal retainer, a rotary side O-ring held by a rotary side seal retainer, and fixed side and rotary side seal rings pressed against each other by the respective O-rings so that their opposed surfaces may be slidably held in contact with each other. Such device is improved in order to eliminate oil leakage, to reduce mechanical power loss, to avoid an increase in weight and to shorten the replacement time for lubricant oil by mounting an oil absorbing member made of felt or the like to a peripheral wall surface formed on the opposed surface of the rotary side seal ring.

5 Claims, 2 Drawing Sheets

FLOATING SEAL DEVICE

BACKGROUND OF THE INVENTION

1. Field of the Invention:

The present invention relates to a floating seal device applicable to a drive wheel apparatus of a mining damp truck, or the like.

2. Description of the Prior Art:

At first, description will be made of a drive wheel apparatus of a mining damp truck in the prior art with reference to FIGS. 4 and 5. In FIG. 4, reference numeral 1 designates an axle case fixed to a vehicle body and having therein an electric motor, numerals 3 and 3' designate speed reduction gear devices, numeral 4 designates a wheel hub, numeral 5 designates a floating seal device, numeral 6 designates a bearing for rotatably supporting the above-mentioned wheel hub 4 on the axle casing 1, numeral 7 designates a drive wheel (tire) mounted to the above-described wheel hub 4, and provision is made such that when the electric motor is started rotation of the motor is transmitted via the speed reduction gear device 3 to the wheel hub 4' and thereby the drive wheel 7 is rotated. As shown in FIG. 5, the floating seal device 5 is composed of a fixed side seal retainer 20 fixed to the axle case 1, a rotary side seal retainer 23 fixed to the wheel hub 4, a fixed side O-ring 21 held by a tapered surface of the fixed side seal retainer 20, a rotary side O-ring 24 held by a tapered surface of the rotary side seal retainer 23, a fixed side seal ring 22 and a rotary side seal ring 25. The seal ring 22 on the fixed side (on the side of the axle case 1) and the seal ring 25 on the rotary side (on the side of the wheel hub 4) are resiliently pressed to each other by means of the respective O-rings 21 and 24 with their opposed surfaces 26 allowed to slide relative to each other, and thereby lubricant oil is sealingly closed within the reduction gear device (3 and 3'). When a recessed portion 27 provided in one part of the opposed surface 26 of the rotary side seal ring 25 is immersed in the lubricant oil within the reduction gear device 3, the lubricant oil within the reduction gear device 3 is led from the recessed portion 27 to between the opposed surfaces 26 sliding relative to each other due to capillary phenomena and forms an oil film, whereas when the above-mentioned recessed portion 27 is exposed from the lubricant oil within the speed reduction gear device 3, the lubricant oil sticking to the side walls of the recessed portion 27 is led from the side wall of the recessed portion 27 to between the opposed surfaces 26 sliding relative to each other due to centrifugal forces generated by rotation of the seal ring 25 and forms an oil film.

FIG. 6 shows another example of the floating seal devices in the prior art, in which a wedge-shaped recess is provided between a fixed side seal ring 28 and a rotary side seal ring 29 to thereby enhance the effect of introducing lubricant oil to between opposed surfaces 26 due to capillary phenomena.

In the floating seal device in the prior art shown in FIGS. 4 and 5, whether or not an oil film can be formed between the opposed surfaces 26 is dependent upon an immersed condition of the rotary side seal ring 25 in the lubricant oil. When the level of the lubricant oil within the reduction gear device 3 is low and hence the time when the rotary side seal ring 25 is not immersed is larger than the time of immersion thereof, the lubricant oil sticking to the side walls of the recessed portion 27 is the principal source of the lubricant oil fed to between the opposed surfaces 26. Thus, the amount of the fed oil is deficient, breakdown of the oil film occurs, hence the sliding opposed surfaces 26 become rough due to baking, and leakage of oil occurs. Whereas, if the level of the lubricant oil within the reduction gear device 3 is made high, then although the above-mentioned problem does not occur, the extent of the lubricant oil being stirred by rotary portions in the reduction gear device 3 becomes intense, and thus the loss of mechanical power is increased. In addition, as the amount of the lubricant oil stored within the reduction gear device 3 is increased, the weight of the device is increased, and moreover, there occurs the problem that replacement of the lubricant oil takes more time. The above-mentioned problems are also the same in the case of the prior art floating seal device shown in FIG. 6.

SUMMARY OF THE INVENTION

It is therefore one object of the present invention to provide an improved floating seal device, in which leakage of oil does not occur, mechanical power loss can be reduced, an increase in weight does not occur, and the time for replacement of lubricant oil can be shortened.

According to one feature of the present invention, there is provided a floating seal device including a fixed side O-ring held by a fixed side seal retainer, a rotary side O-ring held by a rotary side seal retainer, and fixed side and rotary side seal rings pressed against each other by the above-mentioned rspective O-rings so that their opposed surfaces may be slidably held in contact with each other, wherein an oil absorbing member made of felt or the like is mounted to a peripheral wall surface formed on the opposed surface of the rotary side seal ring.

In operation of such floating seal device according to the present invention, when a drive apparatus such as an electric motor is started, the rotation of the drive apparatus is transmitted to a wheel hub via a speed reduction gear device and a drive wheel is being rotated, the fixed side (the axle case side) seal ring and the rotary side (the wheel hub side) seal ring are resiliently pressed against each other by the fixed side O-ring and the rotary side O-ring so that their respective opposed surfaces may slide relative to each other, and thereby lubricant oil is sealing closed within the reduction gear device. In addition, as an axial seal ring is rotating, when the oil absorbing member made of felt or the like and mounted to the peripheral wall surface formed on the opposed surface of the rotary side seal ring is immersed in the lubricant oil within the reduction gear device, the lubricant oil within the reduction gear device is made to permeate into and is held in the oil absorbing member by capillary phenomena. On the othe hand, when the oil absorbing member is exposed from the lubricant oil within the reduction gear device, the lubricant oil penetrated into and held in the oil absorbing member is led from the oil absorbing member to between the sliding opposed surfaces by capillary phenomena and centrifugal forces generated by rotation of the rotary side seal ring, and thereby an oil film is formed.

Moreover, when the oil absorbing member, mounted to the peripheral wall surface of the rotary side seal ring, is held is contact with the peripheral wall surface of the fixed side seal ring, a sealing capability is produced, and thereby leakage of the lubricant oil in the oil absorbing member can be prevented.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

Figure 1:
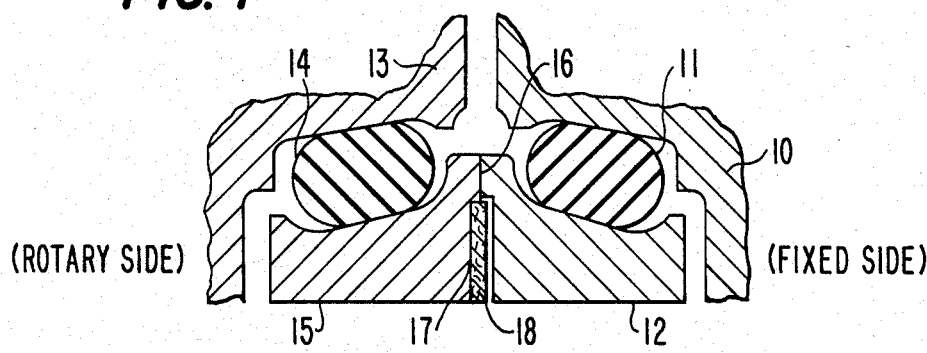
FIG. 1 is a longitudinal cross-sectional side view showing one preferred embodiment of the present invention.

Now the floating seal device according to the present invention will be described in connection with one preferred embodiment illustrated in FIG. 1. In this figure, reference numeral 10 designates a fixed side seal retainer that is fixedly secured to an axle case (see the axle case 1 in FIG. 4.), numeral 13 designates a rotary side seal retainer that is fixed secured to a wheel hub (see the wheel hub 4 in FIG. 4.), numeral 11 designates a fixed side O-ring held by a tapered surface of the above-mentioned fixed side seal retainer 10, numeral 14 designates a rotary side O-ring held by a tapered surface of the above-mentioned rotary side seal retainer 13, numeral 12 designates a fixed side seal ring, numeral 15 designates a rotary side seal ring, numeral 16 designates opposed surfaces of the rotary side seal ring 15 and the fixed side seal ring 12, and numeral 17 designates a peripheral wall surface (a recessed portion) provided in one portion of the opposed surfaces 16. An oil absorbing member 18 made of felt or the like is mounted to the peripheral wall surface 17 of the rotary side seal ring 15, and the surface of the oil absorbing member 18 on the side opposite to the surface mounted to the peripheral wall surface 17 of the above-mentioned rotary side seal ring 15 is adapted to be spaced a slight distance from the peripheral wall surface of the fixed side seal ring 12. The above-described fixed side seal ring 12 and the above-described rotary side seal ring 15 are pressed to each other by the above-mentioned respective O-rings 11 and 14, so that their respective opposed surfaces 16 are slidably kept in contact with each other.

Figure 4:
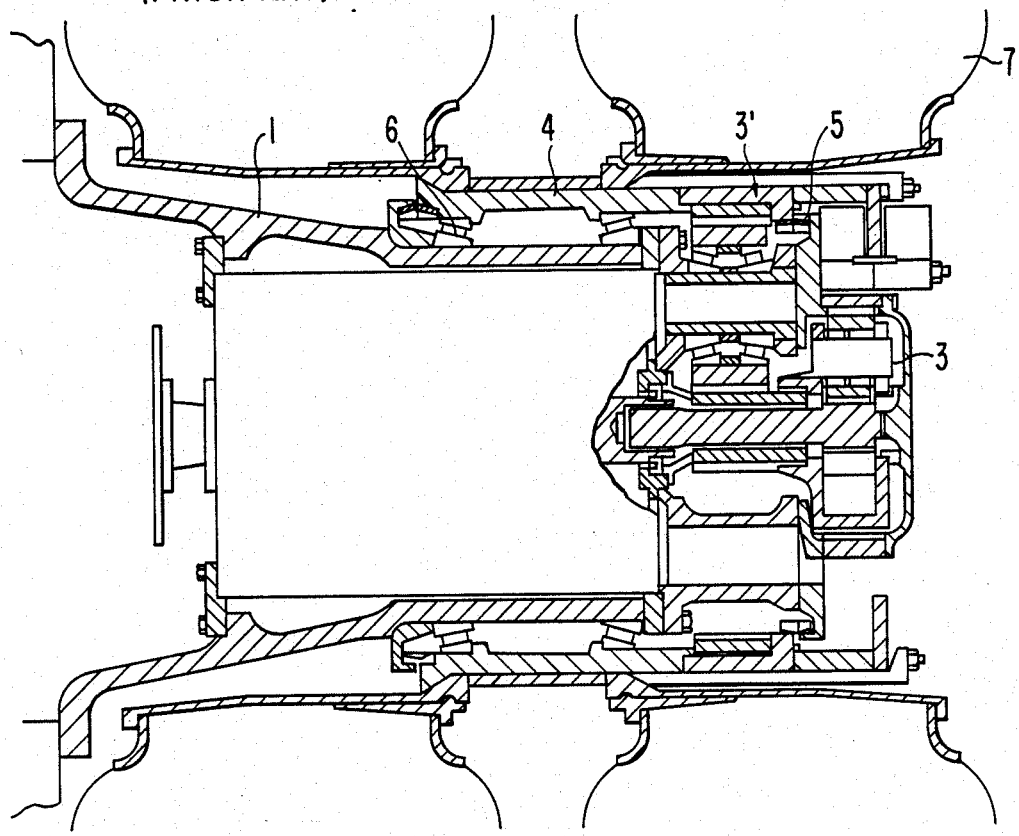
FIG. 4 is a side view partly in cross-section showing an outline of a floating seal device of the prior art.
Figure 5:
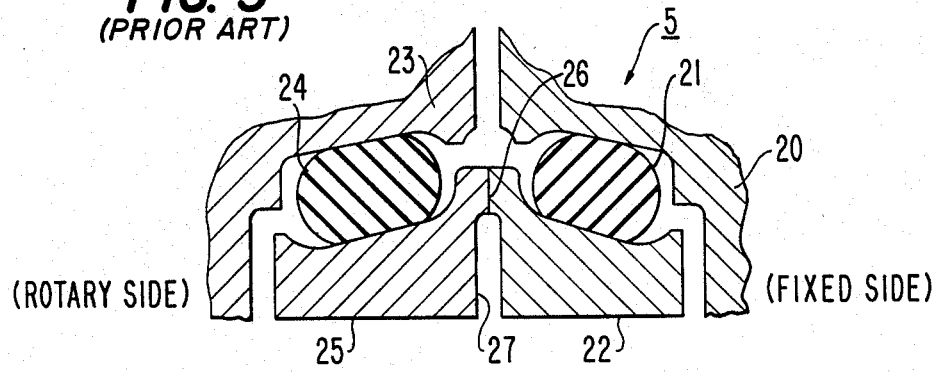
FIG. 5 is a longitudinal cross-sectional side view showing details of the same floating seal device of the prior art.
Figure 6:
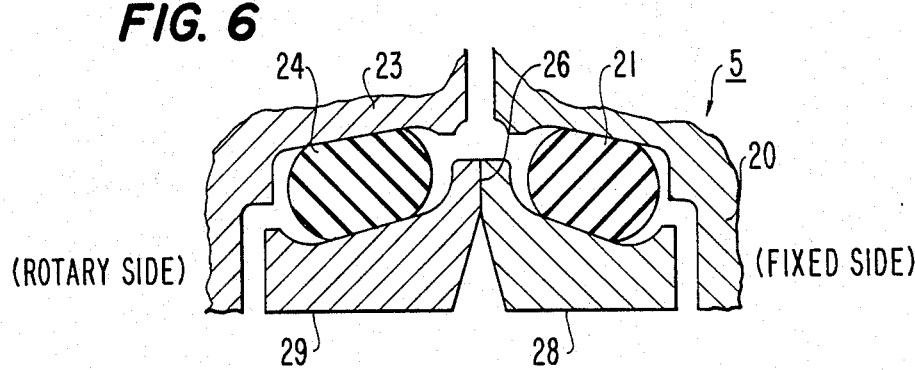
FIG. 6 is a longitudinal cross-sectional side view showing another example of a floating seal device of the prior art.

Now the operation of the floating seal device shown in FIG. 1 will be explained in greater detail. When an electric motor 2 shown in FIG. 4 is started, the rotation of the motor 2 is transmitted to a wheel hub 4 via a speed reduction gear device 3 and thus a drive wheel 7 is rotating, the fixed side (the axle case 1 side) seal ring 12 and the rotary side (the wheel hub 4 side) seal ring 15 are resiliently pressed against each other by the O-rings 11 and 14 so as to allow sliding movement between the respective opposed surfaces 16, and thereby lubricant oil is sealingly closed within the reduction gear device 3. When the recessed portion 17 provided in one portion of the opposed surface 16 of the rotary side seal ring 15 and the oil absorbing member 18 made of felt or the like and mounted to the side wall surface of the same recessed portion 17 are immersed in the lubricant oil within the reduction gear device 3 during rotation of the seal ring 15, the lubricant oil within the reduction gear device 3 is made to permeate into and is held in the oil absorbing member 18 by capillary phenomena. On the other hand, when the recessed portion 17 and the oil absorbing member 18 are exposed from the lubricant oil within the reduction gear device 3, the lubricant oil penetrated into and held in the oil absorbing member is led from the oil absorbing member 18 to between the sliding opposed surfaces 16 by capillary phenomena and centrifugal forces generated by rotation of the seal ring 15, and thereby an oil film can be formed.

Figure 2:
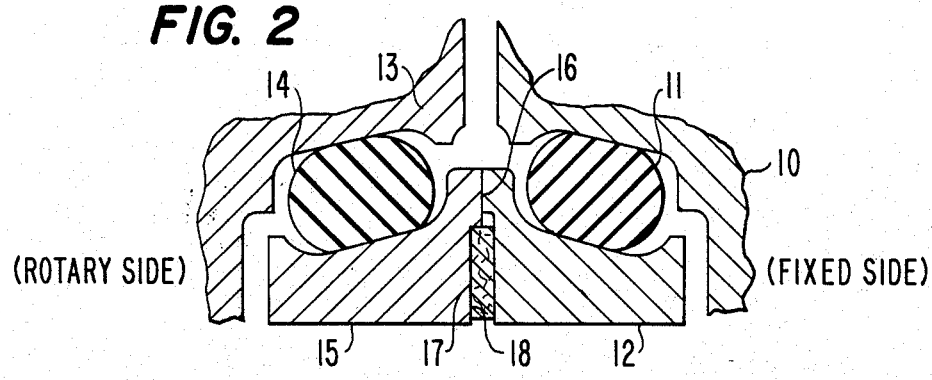
FIGS. 2 and 3 are longitudinal cross-sectional side views showing other different preferred embodiments of the present invention.
Figure 3:
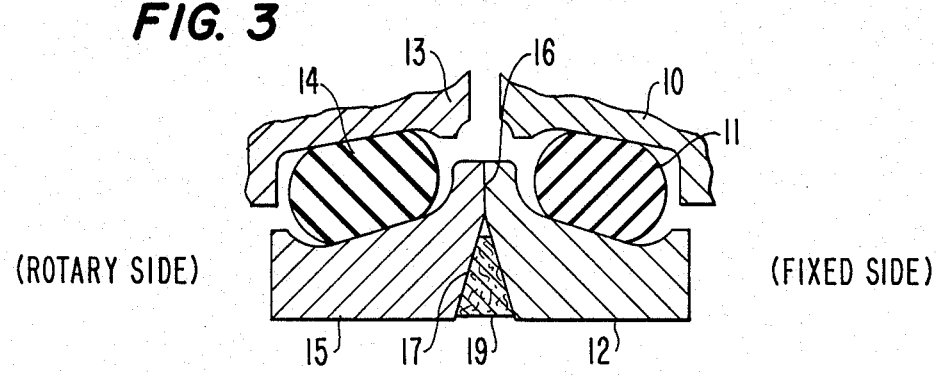

FIG. 2 shows another preferred embodiment in which the oil absorbing member 18 is mounted to the recessed peripheral wall surface 17 of the rotary side seal ring 15' and also the oil absorbing member 18 is in contact with the peripheral wall surface of the fixed side seal ring 12' such that member 18 has a sealing capability. FIG. 3 shows still another preferred embodiment in which a wedge-shaped space is formed by the peripheral wall surfaces of the fixed side seal ring and the rotary side seal ring, a wedge-shaped absorbing member 19 is mounted to the peripheral wall surface 17 of the rotary side seal ring 15, and also such oil absorbing member 19 is in contact with the peripheral wall surface of the fixed side seal ring 12, such that member 19 has a sealing capability. In these modified embodiments, the same operation as the first preferred embodiment is effected and similar advantages can be attained.

As described in detail above, in the floating seal device according to the present invention, when a drive apparatus such as an electric motor is started, its rotation is transmitted via a reduction gear device to a wheel hub and a drive wheel is rotating, a fixed side (an axle case side) seal ring and a rotary side (a wheel hub side) seal ring are resiliently pressed to each other by a fixed side O-ring and a rotary O-ring to allow sliding movement beween their respective opposed surfaces, and thereby lubricant oil can be sealingly closed within the reduction gear device. In addition, when an oil absorbing member made of felt or the like mounted to a peripheral surface formed on an opposed surface of the rotary side seal ring is immersed in the lubricant oil within the reduction gear device while the seal ring is rotating, the lubricant oil within the reduction gear device is made to permeate into and held in the absorbing member by capillary phenomena, whereas when the absorbing member is exposed from the lubricant oil within the reduction gear device, the lubricant oil permeated into and held in the oil absorbing member is led from the absorbing member to between the sliding opposed surfaces by capillary phenomena and centrifugal forces generated by rotation of the rotary side seal ring, and thereby an oil film can be formed between the sliding opposed surfaces. Therefore, lubricant oil always can be fed to between the opposed surfaces, breakdown of the oil film does not occur, the sliding opposed surfaces are not roughened by baking, and oil leakage is not caused. Moreover, there is no need to raise the level of the lubricant oil within the reduction gear device, the extent of the rotary portions in the reduction gear device stirring the lubricant oil can be lessened, and thus mechanical power loss can be reduced. Furthermore, since the amount of the lubricant oil stored within the reduction gear device can be reduced, an increase of weight does not occur, and moreover there is an advantage that the time necessary for replacement of lubricant oil can be shortened.

While a principle of the present invention has been described above in connection with preferred embodiments of the invention, it is intended that all matter contained in the above description and shown in the accompanying drawings shall be interpreted to be illustrative and not as a limitation to the scope of the invention.

What is claimed is

1. In a floating seal device including a fixed side O-ring held by a fixed side seal retainer, a rotary side O-ring held by a rotary side seal retainer, and fixed side and rotary side seal rings pressed against each other by said respective O-rings so that their opposed surfaces may be slidably held in contact with each other the improvement wherein:

an oil absorbing member made of felt or the like is mounted to a peripheral wall surface formed on said opposed surface of said rotary side seal ring.

2. A floating seal device as claimed in claim 1, wherein a recessed peripheral wall surface is provided on one portion of said opposed surface of said rotary side seal ring, and said oil absorbing member made of felt or the like is mounted to said peripheral wall surface.

3. A floating seal device as claimed in claim 1, wherein said oil absorbing member is held in contact with a peripheral wall surface of said fixed side seal ring.

4. A floating seal device as claimed in claim 1, wherein a wedge-shaped space is formed by peripheral wall surfaces of said fixed side and rotary side seal rings, and said oil absorbing member made of felt or the like is mounted to said peripheral wall surface of said rotary side seal ring and is also held in contact with said peripheral wall surface of said fixed side seal ring.

5. A floating seal device as claimed in claim 2, wherein said oil absorbing member is held in contact with a peripheral wall surface of said fixed side seal ring.

* * * * *